United States Patent
Elkington et al.

(10) Patent No.: US 10,859,724 B2
(45) Date of Patent: Dec. 8, 2020

(54) METHODS OF AND APPARATUSES FOR IMPROVING LOG DATA

(71) Applicant: Reeves Wireline Technologies Limited, Leicestersire (GB)

(72) Inventors: Peter Adrian Spencer Elkington, Loughborough (GB); Said Assous, Nottingham (GB); Laurence Linnett, Edinburgh (GB)

(73) Assignee: Reeves Wireline Technologies Limited

( * ) Notice: Subject to any disclaimer, the term of this patent is extended or adjusted under 35 U.S.C. 154(b) by 991 days.

(21) Appl. No.: 14/290,187

(22) Filed: May 29, 2014

(65) Prior Publication Data

US 2014/0365133 A1    Dec. 11, 2014

(30) Foreign Application Priority Data

Jun. 5, 2013 (GB) ................................ 1310044.1

(51) Int. Cl.
    *G01V 1/50* (2006.01)
(52) U.S. Cl.
    CPC ...................................... *G01V 1/50* (2013.01)
(58) Field of Classification Search
    CPC .................................... G01V 1/50; G01V 1/28
    (Continued)

(56) References Cited

U.S. PATENT DOCUMENTS 4,633,449 A * 12/1986 Ingram .................... G01V 1/44
                                                     367/25

5,275,040 A * 1/1994 Codazzi .................. E21B 21/08
                                                     166/254.1
(Continued)

FOREIGN PATENT DOCUMENTS

| GB | 2477470 A | 8/2011 |
|----|-----------|--------|
| WO | 2003058278 A1 | 7/2003 |
| WO | 2009035848 A3 | 3/2009 |

OTHER PUBLICATIONS

Wikipedia (http://en.wikipedia.org/wiki/instantaneous_phase), Jan. 2012.*

(Continued)

*Primary Examiner* — Gregory J Toatley, Jr.
*Assistant Examiner* — Douglas Kay
(74) *Attorney, Agent, or Firm* — Blank Rome LLP

(57) ABSTRACT

Disclosed herein is method of computing formation attributes from acoustic measurements in a borehole. The acoustic measurements can be made by operating an acoustic source at multiple frequencies to excite the formation and operating receivers at multiple, longitudinally spaced receiver stations to receive acoustic energy from the formation. The method can include: deriving phase data from the spectrum of received acoustic signals; unwrapping phase information of the phase spectrum data; determining two or more values of difference of phase between acoustic signals at each of a range of frequencies each based on a single generated signal received at two or more pairs of adjacent said receiver stations; generating a value of slope of phase difference values; and in any case of slope ambiguity, unwrapping phase difference information and deriving a dominant slope, at each frequency, from which slowness of the acoustic signal in the formation can be derived.

15 Claims, 5 Drawing Sheets

(58) Field of Classification Search
USPC .......................................................... 702/14
See application file for complete search history.

(56) References Cited

U.S. PATENT DOCUMENTS

| | | | | |
|---|---|---|---|---|
| 5,617,371 | A * | 4/1997 | Williams | G01S 3/8083 367/124 |
| 7,529,150 | B2 * | 5/2009 | Yogeswaren | G01V 1/44 181/102 |
| 7,755,972 | B2 * | 7/2010 | Yogeswaren | G01V 1/44 181/104 |
| 8,379,483 | B2 * | 2/2013 | Tang | G01V 1/50 367/31 |
| 9,121,860 | B1 * | 9/2015 | Cronyn | G01P 3/00 |
| 2003/0130796 | A1 * | 7/2003 | Wiggins | G01V 1/282 702/14 |
| 2003/0139884 | A1 * | 7/2003 | Blanch | G01V 1/48 702/6 |
| 2003/0185100 | A1 * | 10/2003 | D'Angelo | G01N 29/07 367/82 |
| 2004/0257911 | A1 * | 12/2004 | Tang | G01V 1/48 367/81 |
| 2006/0062082 | A1 * | 3/2006 | Mandal | G01V 1/44 367/25 |
| 2007/0183259 | A1 * | 8/2007 | Yogeswaren | G01V 1/44 367/25 |
| 2009/0185447 | A1 * | 7/2009 | Yogeswaren | G01V 1/44 367/31 |
| 2010/0085835 | A1 * | 4/2010 | Tang | G01V 1/30 367/32 |
| 2010/0157731 | A1 * | 6/2010 | Aeron | G01V 1/30 367/38 |
| 2010/0309748 | A1 * | 12/2010 | Tang | G01V 1/50 367/31 |
| 2014/0236487 | A1 * | 8/2014 | Kimman | G01V 1/288 702/18 |
| 2015/0123665 | A1 * | 5/2015 | Mukhopadhyay | G01V 3/38 324/338 |

OTHER PUBLICATIONS

Dr. Mark Wickert, "ECE 2610, Introduction to Signals and Systems", lecture note Chapter 4, "sampling and alias", Spring semester, 2011.*
Rix (G. J. Rix and et al "Simultaneous Measurement of Surface Wave Dispersion and Attenuation Curves", Journal, GTJODJ, vol. 24, No. 4, Dec. 2001, pp. 350-358.) (Year: 2001).*
J. Martinsoon and et al, "Model-Based Phase Velocity and Attenuation Estimation in Wideband Ultrasonic Measurement Systems", ieee transactions on ultrasonics, ferroelectrics, and frequency control, vol. 54, No. 1, Jan. 2007 (Year: 2007).*
Search Report received in corresponding Great Britain application GB1310044.1 dated Dec. 6, 2013.
Search Report received in corresponding Great Britain application GB1310044.1 dated May 21, 2014.

* cited by examiner

METHODS OF AND APPARATUSES FOR IMPROVING LOG DATA

FIELD OF THE INVENTION

The invention relates to methods of and apparatuses for improving log data.

BACKGROUND OF THE INVENTION

As is well known, prospecting for minerals of commercial or other value (including but not limited to hydrocarbons in liquid or gaseous form; water e.g. in aquifers; and various solids used e.g. as fuels, ores or in manufacturing) is economically an extremely important activity. For various reasons those wishing to extract such minerals from below the surface of the ground or the floor of an ocean need to acquire as much information as possible about both the potential commercial worth of the minerals in a geological formation and also any difficulties that may arise in the extraction of the minerals to surface locations at which they may be used.

For this reason over many decades techniques of logging of subterranean formations have developed for the purpose of establishing, with as much accuracy as possible, information as outlined above both before mineral extraction activities commence and also, increasingly frequently, while they are taking place.

Broadly stated, logging involves inserting a logging tool including a section sometimes called a "sonde" into a borehole or other feature penetrating a formation under investigation; and using the sonde to energize the material of the rock, etc., surrounding the borehole in some way. The sonde or another tool associated with it that is capable of detecting energy is intended then to receive emitted energy that has passed through the various components in the rock before being recorded by the logging tool.

Such passage of the energy alters its character. Knowledge of the attributes of the emitted energy and that detected after passage through the rock may reveal considerable information about the chemistry, concentration, quantity and a host of other characteristics of minerals in the vicinity of the borehole, as well as geological aspects that influence the ease with which the target mineral material may be extracted to a surface location.

In many cases the logging sonde is lowered into the borehole supported on wireline, i.e. armored cable that is capable of transmitting data and electrical power between the sonde and a surface location while also acting to suspend a toolstring including the sonde so that it may be withdrawn from a location deep in the borehole towards the surface location while logging takes place. The nature of wireline will be familiar to those skilled in the art of logging.

Logging techniques are employed throughout the mining industry, and also in particular in the oil and gas industries. The invention is of benefit in logging activities potentially in all kinds of mining and especially in the logging of reserves of oil and gas.

In the logging of oil, coal and gas fields (including fields combined with rock types such as shales) specific problems can arise. Broadly stated this is because it is necessary to consider a geological formation that typically is porous and that contains a hydrocarbon-containing fluid such as oil or gas or (commonly) a mixture of fluids only one component of which is of commercial value.

This leads to various complications associated with determining physical and chemical attributes of the oil or gas field in question. In consequence a wide variety of logging methods has been developed over the years. The logging techniques exploit physical and chemical properties of a formation usually through the use of a logging tool or sonde that is lowered into a borehole (that typically is, but need not be, a wellbore) formed in the formation by drilling.

Typically, as noted, the tool sends energy into the formation and detects the energy returned to it that has been altered in some way by the formation. The nature of any such alteration can be processed into electrical signals that are then used to generate logs (i.e. graphical or tabular representations containing much data about the formation in question).

The borehole usually is several tens of thousands of feet in length yet is narrow (being perhaps as narrow as 3 inches (about 76 mm) or less in diameter), although in practice such a borehole is almost never of uniform diameter along its length.

An aim of the invention is to improve the analysis of certain attributes of log data associated in particular with a type of logging device known as an acoustic logging tool.

Borehole acoustic measurements reveal a multitude of reservoir and wellbore properties. They are used to infer porosity, permeability, lithology, mineralogy pore pressure, invasion, anisotropy, fluid type, stress magnitude and direction, the presence and alignment of fractures and the quality of casing-cement bonds. Improvements in acoustic logging measurements and signal processing are enhancing the ability of logging scientists and other professionals to determine some of these properties. The principal properties of interest are compressional (P) and shear (S) wave velocities (commonly expressed as slowness, the inverse of velocity). Better understanding of the complex interactions between acoustic signals in borehole and the physical properties of the rock through which they are drilled is leading to an improved understanding of how formation properties change over distance and direction. Knowledge of these velocities and associated anisotropy can also be important for designing fracture simulations for enhanced oil recovery operations.

The assessment of velocities versus frequency—usually called dispersion analysis—for specific borehole-related waves has become increasingly important and considered in many geophysical reservoir characterization applications such as shear velocity and borehole-fluid velocity inversion; and radial profiling of formation shear velocities. Usually, the acoustic logging tool measures the time it takes for a pulse of sound (i.e., an elastic wave) to travel from a transmitter to a receiver, which usually are both mounted on the tool or at any rate are typically parts of the same logging toolstring.

The transmitted pulse is characterized by short duration and high amplitude. This travels through the borehole and rock, and along the borehole-rock interface in the form of guided waves. Some of these forms undergo dispersion (spreading of the wave energy in time and space) and attenuation (loss of energy through absorption of energy by the formations).

The tools used to acquire these measurements typically include a monopole source which excites axisymmetric modes and is used primarily to estimate formation compressional and shear velocities from refracted arrivals in fast formations; and a dipole source (non-axisymmetric) which excites in preferential directions, and is more appropriate for formation shear velocity estimation in slow formations.

A cross-dipole configuration is usually used to measure azimuthal variation of formation velocities. In this logging tool arrangement sources and receivers are oriented orthogonally in the azimuthal direction.

In addition to monopole and dipole sources, some logging while drilling (LWD) tools generate quadrupole modes.

The monopole may operate in a frequency band which excites Stoneley and pseudo-Rayleigh modes, the dipole excites flexural modes and the quadrupole excites screw modes. The fundamental modes in each case exist in a wide range of frequencies and asymptote to the Scholte velocity at high frequencies.

The person of skill in the art is familiar with the Stoneley, pseudo-Rayleigh and screw modes of acoustic wave propagation as well as the concept of Scholte velocity.

The Stoneley wave travels at the fluid-borehole interface and is strongly coupled with the fluid properties, especially in fast formations. FIG. 1a shows compressional, shear and Stoneley waves excited by a monopole source; and also head-waves generated in the borehole fluid.

The dipole source excites the fundamental formation flexural mode and higher flexural modes. In fact, all the higher order modes for monopole, dipole and quadrupole asymptote to the formation shear velocity at low frequency and to the fluid compressional velocity at high frequencies in the case of a so-called "fast" formation, the terms "fast" and "slow" in this context being familiar to the person of skill in the art.

In FIG. 1b, the dipole source excitation also creates compressional waves in the borehole fluid that generate flexural waves that propagate along the borehole wall.

FIG. 2 represents the excited modes for monopole, dipole and quadrupole wireline tools in a fast formation (in which the shear velocity is greater than that of the borehole fluid compressional velocity). FIG. 2 shows that the Stoneley mode exhibits a reverse dispersion which is characterized by an increase in phase velocity with respect to frequency, while the dipole flexural and quadrupole screw modes exhibit a dispersion in which low frequencies travel more quickly than high frequencies.

It is desirable to understand how the phase velocities of modes evolve with frequency, in order to extract shear velocities from received acoustic data. Waveforms recorded from the array of receivers typical in an acoustic logging tool contain contributions from different excited modes and extracting these modes and interpreting the results is a challenging objective that the method of the invention seeks to achieve.

One of the main difficulties consists in defining the appropriate signal processing approach to analyzing the data and extracting relevant information. In the time when acoustic logging tools used only two receivers, the formation velocities were estimated by knowing the distance between receivers and the time difference between first arrivals of received acoustic signals. This simplistic approach is highly effective for the first break compressional arrival with a high signal-to-noise ratio. Modern tools gain benefits from the "array of receivers" configuration that will also be familiar to the person of skill in the art, and time-domain semblance methods are used to extract formation velocities.

There exist two major prior art approaches to extracting velocities from recorded array acoustic waveforms: time-domain based waveform analysis methods and frequency-domain based analysis methods. The former, usually called slowness time coherence (STC), is based on a statistical analysis of the signal energy and relies on wave-shape similarity (semblance coherence) in waveforms across the receiver array. The method computes the time coherence between all waveforms from a common transmitter firing across the receiver array for a wide range of arrival times and slowness values, and finds the slowness value(s) with the highest coherence.

These maxima correspond to compressional, shear and Stoneley slownesses at the investigated depth (with "depth" here referring to the depth, along the length of the borehole, at which the data are acquired).

The STC method gives a good answer if each seismic arrival is isolated by filtering either in the time or frequency domain. It has the ability to be fast, robust, simple to implement, and can work with multiple wave-types and with weak arrivals, giving reliable results. However, it has poor resolution and is valid only for non-dispersive situations (i.e., when phase and group speeds are independent of frequency).

Although many of the arrivals that are recorded, such as the flexural, pseudo-Rayleigh and screw modes, are dispersive, the STC method can be adapted to handle dispersive waves.

Frequency-based methods are more desirable for dispersion curve analysis over the range of frequencies excited by the tool. This helps not only to determine what arrivals are present in the data, but also allows identification of the correct formation velocities for dispersive modes.

These methods however require careful interpretation. Again the resolutions achievable using these methods are far from ideal.

They include Prony's method, which is commonly used to detect and extract velocity when the excited modes exhibit dispersion. However both the backward and forward extended Prony methods (BEPM and FEPM) generate aliases, which make the interpretation more difficult.

The maximum entropy (ARMA) methods, and predictive array processing are model-based approaches as they typically involve fitting a chosen number of model functions to the data. This requires a choice for the number of modes expected in the data. This choice affects the quality of results as choosing too many or too few leads to spurious results. Hence, the number of the chosen modes relevant to the interpretation is key and is not derived from the data but rather assumed at the outset, meaning that there is an inherent weakness in such methods.

So-called "maximum-likelihood methods" (MLM) tend to ignore weak arrivals.

Non-parametric methods such as phase minimization or coherency maximization techniques and the homomorphic processing approach are data-adaptive in that they typically do not require the above choice. The latter however can resolve only one mode at a given frequency.

Methods relying on slowness assumptions such as the phase minimization or coherency maximization techniques, also called the "weighted spectral semblance" (WSS) method, are most popular in analyzing acoustic array data.

Another method called Instantaneous Frequency Slowness processing is based on applying the Hilbert transform to the waveforms to obtain the analytical signal for each waveform. The slowness of the acoustic mode of interest (compressional, shear) is then computed by finding the constant phase trajectories. Although the concept is very simple, the technique based on the Hilbert transform approach is not appropriate to broadband waveforms.

Although these techniques are simple, the weighted average provides estimates by using samples from neighboring discrete frequencies (therefore rendering a smoother dispersion curve), and they also present aliased modes and poor resolution.

Conceptually, the methods cited above are frequency domain analogues of the STC approach. However, these methods are very sensitive to noise and require expert interpretation so that spurious results and aliasing modes are not mistaken as true formation velocities.

The problem of aliasing, in which more than one seemingly plausible slowness curve may be apparent in a slowness plot derived using one of the methods summarized above, can be significant.

Challenges therefore remain in developing a new method that preserves processing accuracy with low computational cost without requiring a priori knowledge of the number of modes. In addition, there is a great need for improving resolution and signal-noise-ratio (SNR) in dispersion analysis compared to the prior art.

SUMMARY OF INVENTION

According to the invention in a first aspect there is provided a method of computing, from acoustic measurements generated from operating an acoustic source to energize at plural frequencies an earth formation penetrated by a borehole and operating receivers defining plural, longitudinally spaced receiver stations to receive acoustic energy altered by the earth formation, one or more formation attributes the method comprising the steps of:

a. deriving phase data from the spectrum of received acoustic signals;

b. unwrapping phase information of the phase spectrum data;

c. determining two or more values of difference of phase between acoustic signals at each of a range of frequencies each based on a single generated signal received at two or more pairs of adjacent said receiver stations;

d. based on Step c. generating a value of slope of a line fitted to a graph of phase difference versus receiver spacing; and e. in any case of slope ambiguity, unwrapping phase difference information resulting from step d., and deriving a dominant slope, at each frequency, from which is derivable the slowness of the acoustic signal in the earth formation.

The method of the invention thus may be regarded as a phase-based dispersion analysis (PBDA) method, which advantageously is a non-parametric and data-driven algorithm that does not exhibit or rely on any model-based assumption for slowness calculation. The method of the invention generates a temporal high resolution dispersion curve.

Preferred aspects of the method of the invention are defined in the claims hereof One optional aspect of particular desirability is the step of converting a difference of phase spectrum information between one or more respective pairs of said received signals to time delay information.

Dispersion as discussed herein is one attribute, of several, associated with the calculation of velocity as a function of frequency. As noted herein therefore preferably the range of attributes that may be enhanced using the method of the invention may be somewhat broad.

Thus, for example, it is possible within the scope of the invention to fit a sigmoid function to the dispersion curve and generate sigmoid parameters as logs versus depth, these having the potential to have petrophysical significance.

Furthermore, as noted herein the invention resides in one or more logging tools, especially an acoustic logging tool, including or operatively connected to one or more programmable devices that are programmed to carry out a method in accordance with the invention as defined herein. When the apparatus of the invention is configured as an acoustic logging tool it relates to any acoustic logging tool able to detect a dispersive mode in a borehole, including dipole and cross-dipole tools as well as quadrupole tools sometimes used in LWD applications.

Viewed differently the invention may be considered to be a method of computing, from acoustic measurements in which the velocities of acoustic waves are calculated at multiple frequencies from differences between the phase of each frequency observed at an array of receivers separated from one or more acoustic sources, attributes of an earth formation penetrated by a borehole; and resolving the ambiguity that occurs when the phase difference across the array exceeds 360 degrees.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1A:
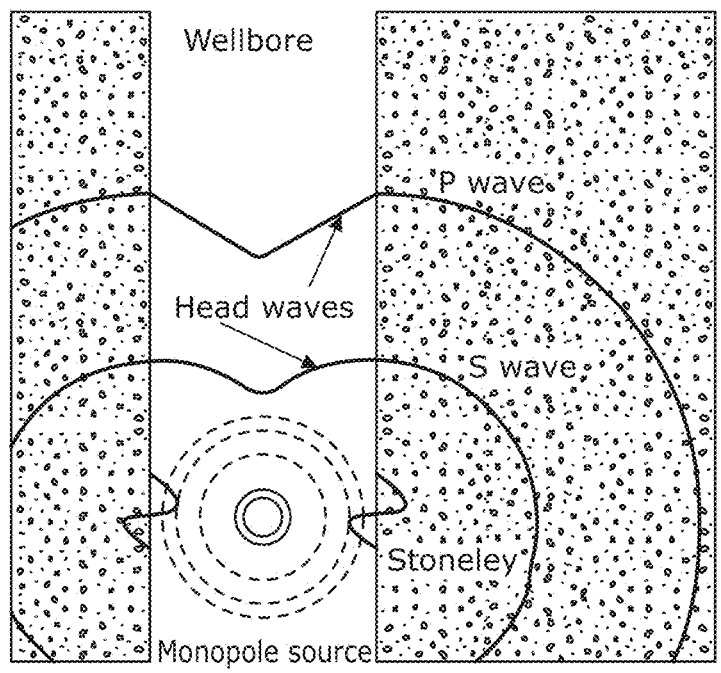
FIG. 1a illustrates elastic wave propagation in a fast formation, near the boundaries of a wellbore, resulting from monopole source excitation.
Figure 1B:
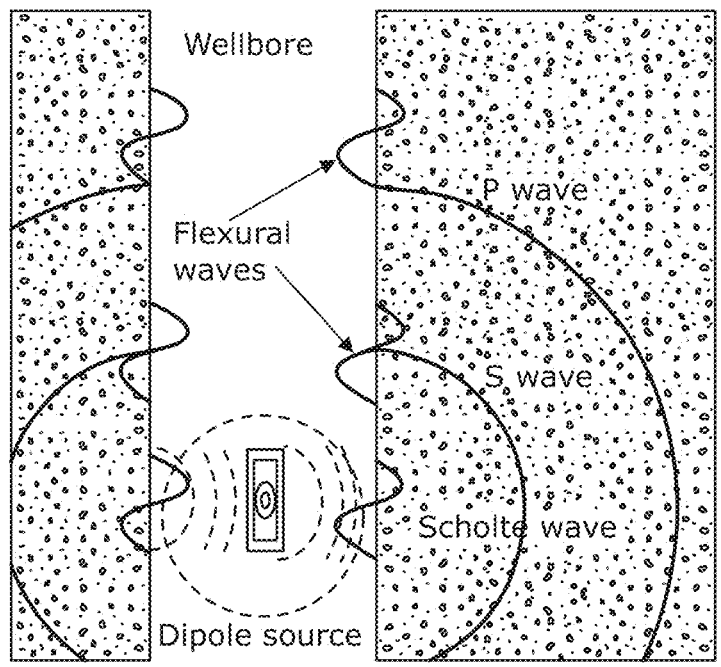
FIG. 1b shows a similar view to FIG. 1a of the effects of dipole source excitation.

It is known that flexural waves generated by a dipole source exhibit dispersion. They exist in both fast and slow formations, and their velocity in the low-frequency limit is the formation shear velocity. A dipole acoustic logging tool 10 such as that shown in FIG. 3 using orthogonal waves is able to measure shear velocity in slow formations and velocities and polarizations of split shear waves in an anisotropic formation. In anisotropic formations, the flexural waves generally split into a fast and a slow wave the polarizations of which are aligned with those of the fast and slow shear waves propagating parallel to the borehole.

The logging tool 10 typically but not necessarily would be conveyed supported on wireline into a borehole and would be withdrawn in a per se known manner towards a surface location while logging takes place.

The low frequency velocity limits of these waves are the fast and slow shear velocities, respectively. In order to estimate phase velocities of dispersive guided waves from array waveforms, the method of the invention extracts the dispersion curves from the waveforms. The method of the invention is based on measuring the phase in each receiver and then converting this phase to a time delay. As the distance between each pair of receivers in an acoustic logging tool is usually known, this permits the derivation of velocities and hence slownesses (i.e. the inverses of the velocities).

The method of the invention is straightforward, it does not introduce spurious estimates, and it does not suffer from any problems associated with phase unwrapping.

Describing the method in more detail it is necessary to consider a dipole source acoustic logging tool 10 (FIG. 3) firing (i.e. emitting acoustic energy) into a formation through borehole fluid. The tool 10 includes orthogonal dipole transmitters 12 labelled respectively as Tx and Ty in FIG. 3 and an array of n receivers 11 identified as $R_{y1}$ ... $R_{y8}$ and $R_{x1}$ ... $R_{x8}$ to signify the orthogonality of the operational orientations of the receivers 11 and described below and that obtain a measurement of the wavefield. Usually, for each dipole receiver channel, there exist four components A, B, C and D. The XX component is formed by subtracting (A-C) and the YY component is formed by subtracting (B-D), where A and C waveforms are in the XX direction and B, D waveforms are in the YY direction forming a 90 degrees angle with the XX direction. These differences are known as differentiated waveforms.

Although the tool 10 is shown including eight receiver stations (hence the notation used to identify the receivers) in other embodiments of the invention other numbers of receiver stations greater than or equal to two may be present.

The described subtraction beneficially cancels out residual Stoneley waveforms in ideal situations. The latter exist because the cross-dipole tool 10 is assumed to not have perfect directionality, with the result that the Stoneley modes will be also excited. In other words, the tool 10 of FIG. 3 to a limited extent exhibits characteristics of a monopole tool and these must be taken account of in the processing method of the invention.

The two in-line resulting waveform components XX and YY are very useful for assessing formation anisotropy induced by layering, fractures, or tectonic stress.

Figure 3:
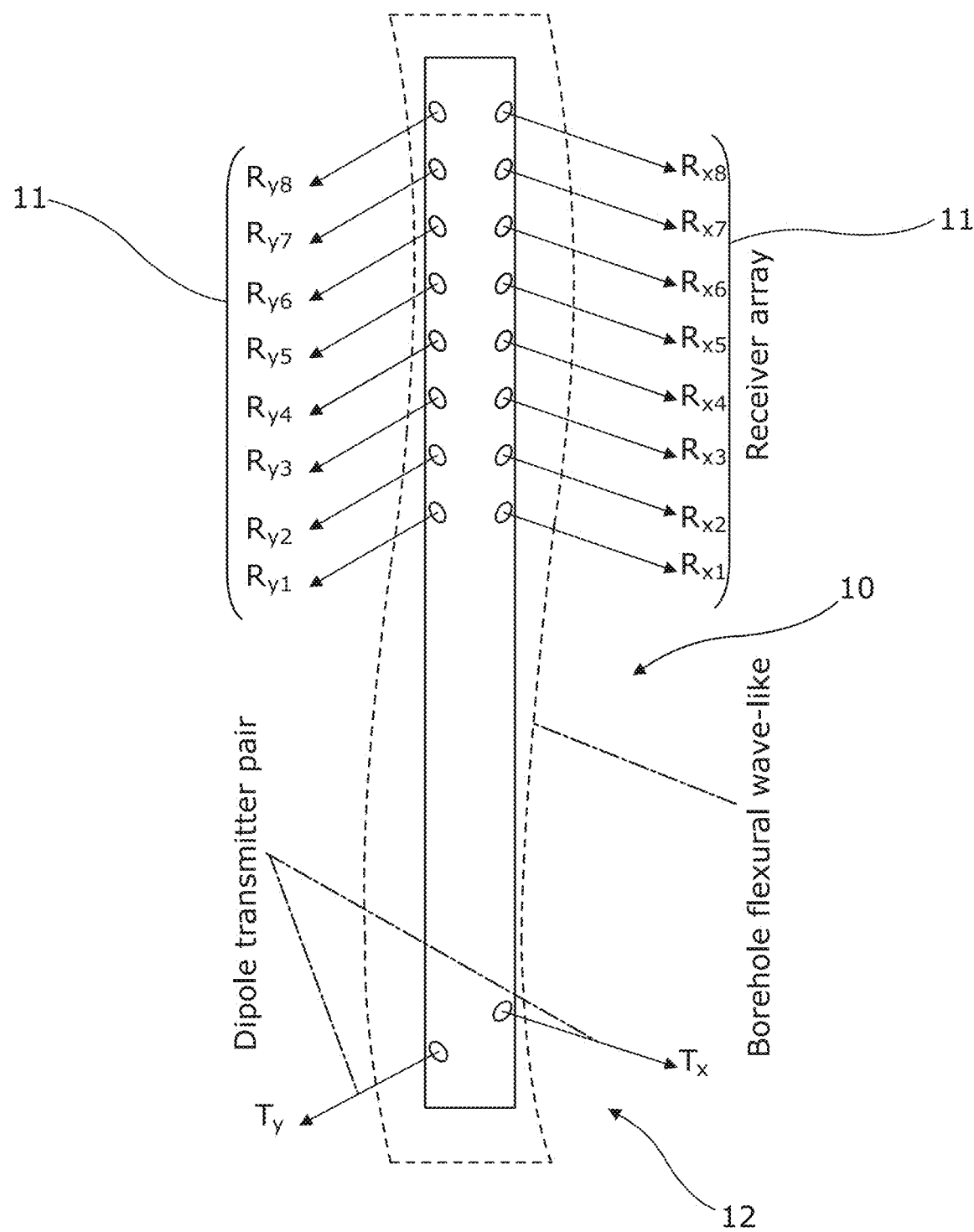
FIG. 3 is a perspective view of one form of logging tool (a cross-dipole acoustic logging tool) according to the invention, and showing the modes of flexural wave that can be induced by such a tool together with indications of the locations of the transmitter and receiver elements.

Considering eight waveforms as may be generated by a tool 10 illustrated in FIG. 3 inferred either from the XX or YY direction, the time domain waveforms are digitally sampled with sampling frequency Fs giving N recorded samples for each channel. A Fourier transform is then applied to the n=8 waveforms providing magnitude and phase information.

The Fourier transform gives a frequency resolution defined by the ratio Fs/N. Hence, the sampling frequency and the length of the signal should be chosen carefully for a desirable resolution. This can be optimized if the excitation source is controlled in terms of frequency content.

Assuming that the waveforms are x1(t), . . . , x8(t) resulting from the differentiated waveforms from the evenly spaced 8 channels, the corresponding Fourier transforms are given by X1(f), . . . , X8(f), where each Xi(f) gives a magnitude Ai(f) and phase offset ϕi(f).

As noted above, the interest is the phase change at each frequency, since this is a measure of time and knowing the receiver spacings, this permits a velocity to be determined.

As mentioned before, the frequency resolution is Fs/N. Therefore only frequencies which are integer multiples of Fs/N will be examined.

The receiver spacing is d. The waveforms will have a propagation delay from one receiver to another, when dispersion exists. The delay occurs also between frequencies.

The phase difference (AO) between two receivers for the same frequency can be converted to time delay by the following relation:

$$\tau = \Delta\phi/360 f \quad (1)$$

in which Δϕ is measured in degrees per transducer and f is the frequency under consideration.

Since the spacing distance d is known for this phase change and time τ, it is possible to compute the velocity (V) in m/s and hence slowness (S=1/V) in μ/ft as follows:

$$S = 1/V = \Delta\phi/360 f d \quad (2)$$

in which K=304878 is a conversion factor from m/s to μ/ft.

Using the phase offsets for all the multiple frequencies of Fs/N up to Nyquist Fs/2, all the Δϕi=1 . . . 7 between all successive pairs of receivers can be measured.

Before processing the Δϕi=1 . . . 7, the phases ϕi=1 . . . 8 need to be unwrapped. Plotting these seven phase differences versus channels for each frequency in accordance with an aspect of the invention gives a slope from which the velocity (slowness) can be deduced as follows:

$$S = 1/V = K|\text{Slope}|/360 f d \quad (3)$$

Figure 4A:
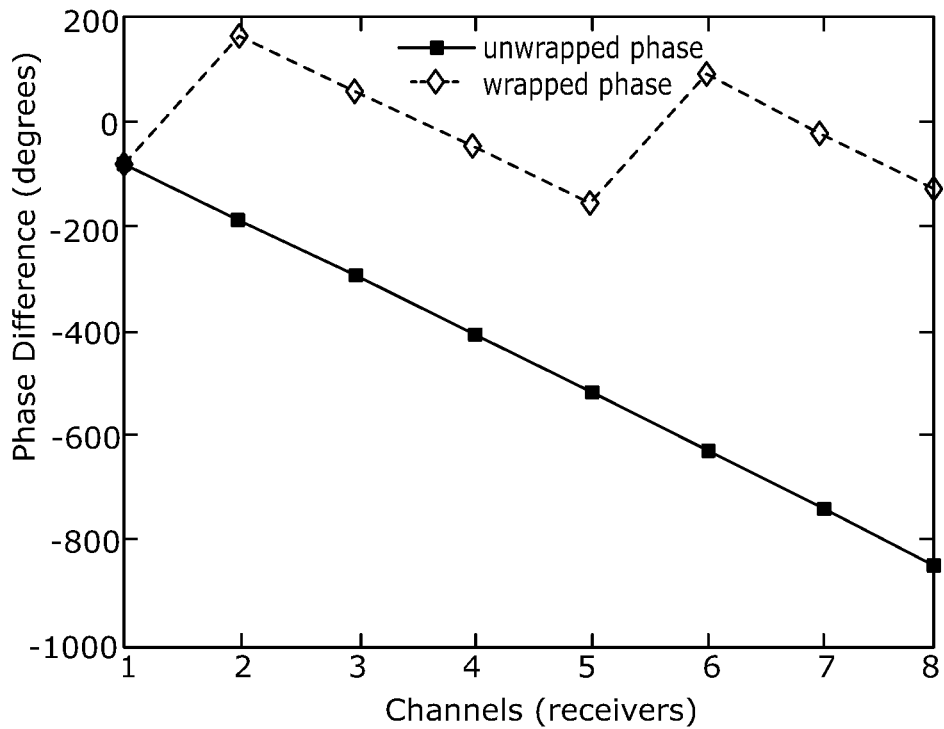
FIGS. 4a and 4b show the values of phase difference that may arise at the receivers of a logging tool as shown in FIG. 3, both before unwrapping of phase difference information in accordance with the invention (dotted line) and after this step (solid line) respectively for noise-free (FIG. 4a) and relatively noisy (FIG. 4b) boreholes.
Figure 4B:
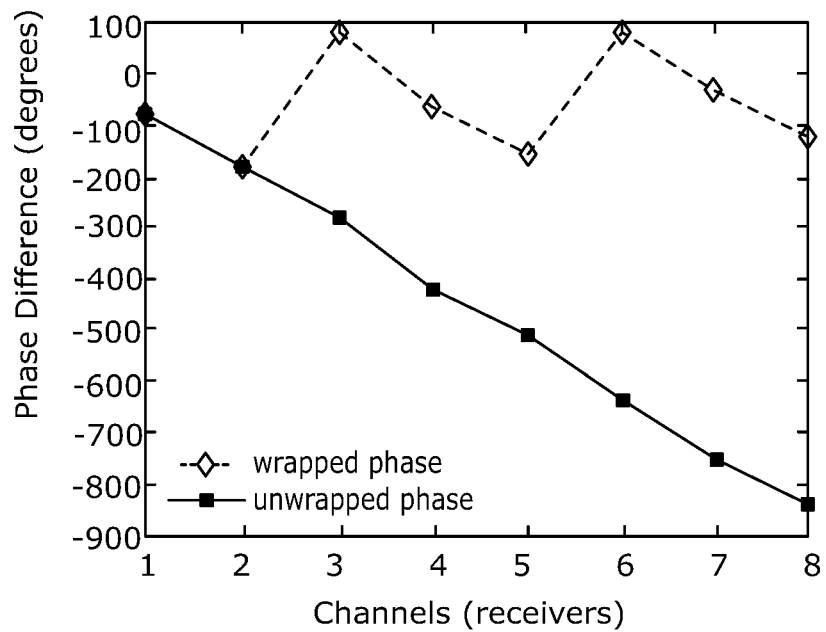

FIGS. 4a and 4b show in respectively noise-free (FIG. 4a) and relatively noisy, i.e. characterized by a signal-to-noise ratio of 5 dB, (FIG. 4b) boreholes the phase offsets both before (dotted lines) and after (solid lines) the unwrapping step takes place.

This formula in accordance with the invention is more robust than the prior art to noise as V is measured in a least squares sense when determining the slope from the seven AO measurements.

As is apparent from FIGS. 4a and 4b, following unwrapping a single line can be fitted to the phase plot and the slowness information calculated.

In the case in which wavelength λ=V/f<d, a phase ambiguity will appear. A phase correction is therefore needed to obtain all the Δϕi=1 . . . 7 unambiguously and give a correct slope estimation.

The last step is to construct the slowness vs frequency curve from the measured velocities for each frequency.

The method of the invention may be embodied in an algorithm as follows:

From K waveforms (sampling frequency Fs and length/V) acquired from K receivers evenly spaced with distance d:
1. Compute the discrete Fourier transform (DFT) for each waveform and obtain the corresponding phases in degrees $\phi_{ik}$, where i is the frequency index and k is the receiver index;
2. For each frequency fi, compute the K−1 phase differences $\Delta\phi_{ik} = \phi_{i,k+1} - \phi_{i,k}$;
3. Unwrap $\Delta_{\phi ik}$ as described herein;
4. For each frequency fi, obtain the slope corresponding to K−1 phase differences and correct for aliasing; and
5. For each frequency $f_i$ compute the slowness knowing the slope and the spacing d as used in Equation (3).

The step of unwrapping each extracted phase information value $\Delta_{\phi ik}$ includes the steps of determining whether the modulus of each said phase difference value exceeds 180° and if so and if the phase difference is positive subtracting 360 from the phase information; and if so and if the phase difference is negative adding 360° to the phase information.

The method of the invention has been applied to acoustic logging synthetic and field data with highly successful results. The method of the invention gave a better resolution, and was free of aliasing modes compared to prior art methods.

Figure 5A:
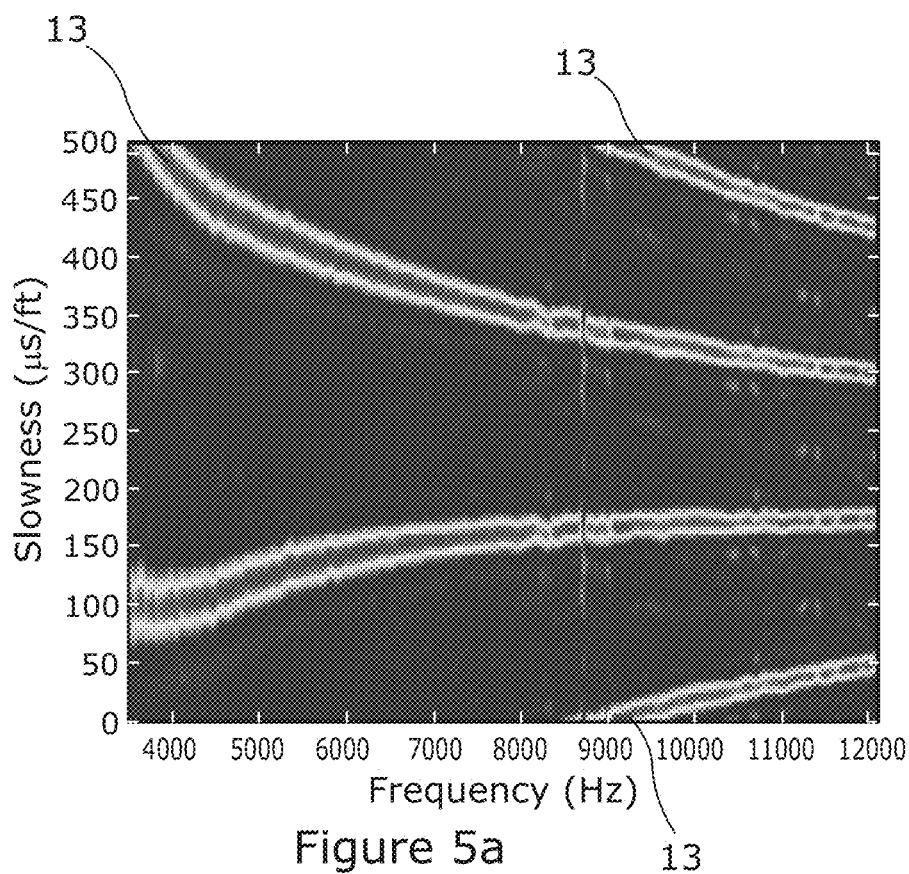
FIGS. 5a and 5b are plots illustrating some benefits of the method of the invention.
Figure 5B:
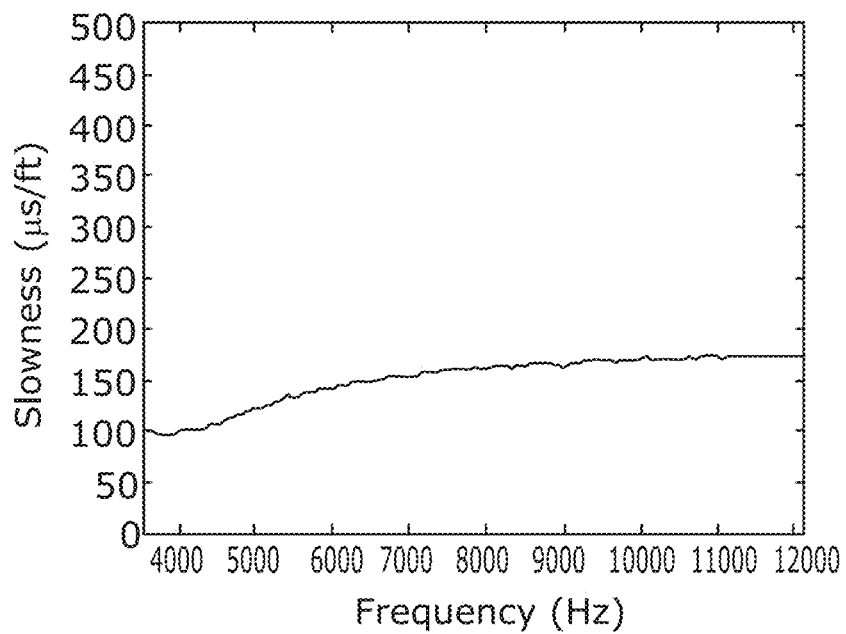

FIGS. 5a and 5b show some of the beneficial effects of the method and apparatus of the invention.

Figure 2:
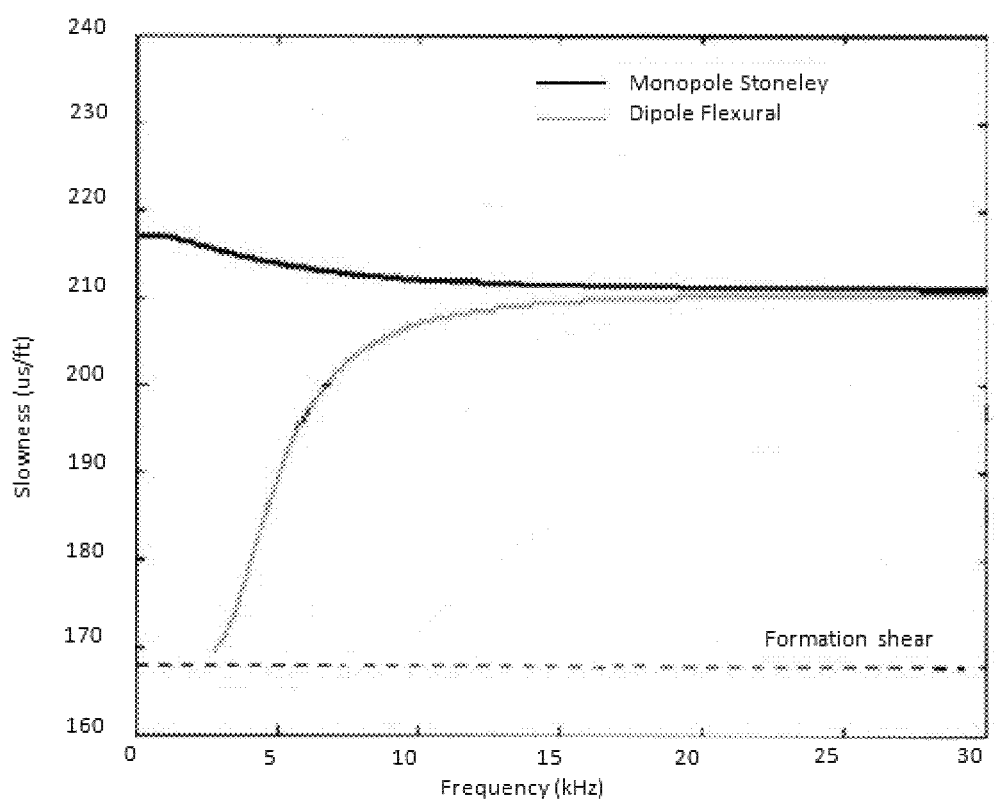
FIG. 2 shows wireline monopole, dipole and quadrupole modes in a fast isotropic formation.

In FIG. 5a, which is a prior art phase dispersion plot generated using a dipole tool such as that shown in FIG. 3 used to indicate formation slowness, the presence of aliases 13 means it is an undesirable starting point for generating a slowness curve of the general form illustrated in FIG. 2. The slowness calculated according to the method of the invention, on the other hand, as illustrated by FIG. 5b is unambiguous and clear; and as noted herein may be generated using a minimum of computational effort.

As explained herein the invention resides in the method described above, in a logging tool including or operatively connected to one or more programmable devices that are programmed to carry out the method; use of a logging tool in carrying out the method; and log data and/or one or more logs obtained using the method and/or the logging tool of the invention.

The listing or discussion of an apparently prior-published document in this specification should not necessarily be taken as an acknowledgement that the document is part of the state of the art or is common general knowledge.

The invention claimed is:

1. A method of improving acoustic logging to evaluate an earth formation penetrated by a borehole for mineral material, the method comprising:
    operating an acoustic source to energize the earth formation with source signals at plural frequencies;
    operating receivers defining plural longitudinally spaced receiver stations to receive acoustic signals altered by the earth formation to obtain acoustic measurements;
    computing, from the acoustic measurements, one or more attributes of the earth formation by:
        a. determining phase information-containing signals indicative of values of a spectrum of the acoustic signals received by the receivers;
        b. by comparing the phase information-containing signals for two or more adjacent receiver stations, determining two or more values of difference of phase between the acoustic signals at each of a range of the frequencies, wherein each of the frequencies is based on a single one of the source signals generated by the acoustic source and received at the two or more adjacent receiver stations;
        c. based on Step b., generating a value of slope of a line fitted to a graph of the two or more values of the difference of phase versus receiver spacing;
        d. identifying phase difference ambiguity arising when a wavelength of a waveform received at the adjacent receiver stations is less than the spacing between the adjacent receiver stations and correcting the phase difference ambiguity by adding to or subtracting from the phase difference resulting from Step c. an integer number of multiples of 360° of phase required to remove the identified phase difference ambiguity; and
        e. deriving a dominant slope without the phase difference ambiguity, at each frequency, from which is derivable a slowness of the acoustic signal in the earth formation; and
    characterizing the mineral material of the earth formation based on the one or more computed formation attributes.

2. The method according to claim 1, further including deriving magnitude of signal information from the received acoustic signals.

3. The method according to claim 2, including the step of applying a Fourier transform to the received acoustic signals whereby to derive phase spectrum and signal magnitude information.

4. The method according to claim 1, wherein the attribute is selected from the list including the velocity, slowness and/or attenuation of the acoustic signal in the earth formation.

5. The method according to claim 4, wherein when the attribute is or includes attenuation of the acoustic signal in the earth formation, the method includes assessing the magnitude of one or more signals received at one or more said receiver stations.

6. The method according to claim 1, including the step of converting a difference of phase spectrum information between one or more respective pairs of the said received signals to time delay information.

7. The method according to claim 6, including the step of calculating a plurality of velocity or slowness measures from the time delay information; plotting the velocity or slowness measures against the identities of the receiver stations corresponding to the respective received signals; and deriving from the resulting plot the said value of slope of phase difference values.

8. The method according to claim 1, wherein the step b. of unwrapping phase difference values includes the steps of (b1) determining whether the modulus of each phase difference value exceeds 180° and if so and if the phase difference is positive (b2) subtracting 360° from the phase information; and if so and if the phase difference is negative (b3) adding 360° to the phase information.

9. The method according to claim 1, wherein the received acoustic signals include at least one XX and at least one YY signal and wherein the method includes the steps of (f) identifying curves that are indicative of the dispersion of phase information in the XX and YY curves; (g) using the identified curves to determine instances when the XX phase information equals the YY phase information; (h) determining based on Step (f) a dominant curve at each location in the phase information; and (i) using the dominant curve in Steps (d) and (e).

10. The method according to claim 1, wherein the received acoustic signals include at least one XX and at least one YY signal, and wherein the method includes the steps of (j) identifying curves that are indicative of the attenuation of information in the XX and YY curves.

11. The method according to claim 1, including the step of operating one or more logging tools in order to generate the acoustic measurements.

12. The method according to claim 11, including the step of operating the one or more logging tools in order to operate one or more said receivers defining plural longitudinally spaced receiver stations to receive acoustic energy altered by the earth formation.

13. One or more logging tools including or operatively connected to one or more programmable devices that are programmed to carry out a method according to claim 1.

14. The method according to claim 1, further including, between Steps a. and b., the Step a1. of unwrapping phase information of the phase spectrum data.

15. A method, comprising:
    computing, from acoustic measurements in which the velocities of acoustic waves are calculated at multiple frequencies from differences between the phase of each frequency observed at an array of receivers separated from one or more acoustic sources, attributes of an earth formation penetrated by a borehole; and
    resolving the ambiguity that occurs when the phase difference across the array exceeds 360 degrees.

* * * * *